United States Patent [19]
Kennedy et al.

[11] Patent Number: 5,689,064
[45] Date of Patent: Nov. 18, 1997

[54] GLIDE HEAD ASSEMBLY AND METHOD THEREFOR

[76] Inventors: Leo Eugene Kennedy, 5125 Halfmoon Dr., Colorado Springs, Colo. 80915; Stanley Clifford Smith, Jr., 10895 Belevidere Ave., Green Mountain Falls, Colo. 80819

[21] Appl. No.: 602,209

[22] Filed: Feb. 1, 1996

[51] Int. Cl.$^6$ .................................................. G01B 5/28
[52] U.S. Cl. ............................................................ 73/105
[58] Field of Search ................................. 73/105; 360/104

[56] References Cited

U.S. PATENT DOCUMENTS

| | | | |
|---|---|---|---|
| 4,532,802 | 8/1985 | Yeack-Scranton et al. | 73/866.4 |
| 5,086,360 | 2/1992 | Smith et al. | 360/104 X |
| 5,166,847 | 11/1992 | Zak | 360/103 X |
| 5,423,207 | 6/1995 | Flechsig et al. | 73/105 X |
| 5,450,747 | 9/1995 | Flechsig et al. | 73/105 |
| 5,488,857 | 2/1996 | Homma et al. | 73/105 |
| 5,499,153 | 3/1996 | Uemura et al. | 360/103 |

OTHER PUBLICATIONS

"Reproduction of Slider Vibrations During Head/Disk Interactions Using PZT Sensors", by *IEEE Transactions of Magnetics*, vol. 24, No. 6, Nov., 1988.

"Novel Piezoelectric Transducers to Monitor Head–Disk Interactions " by *IEEE Transactions of Magnetics*, vol. Mag–22, No. 5, Sep., 1986.

*Primary Examiner*—Hezron E. Williams
*Assistant Examiner*—Daniel S. Larkin
*Attorney, Agent, or Firm*—Timothy J. Martin; Michael R. Henson

[57] ABSTRACT

A glide head assembly is associated with a support structure for use with a system for testing a moving surface to detect a presence of asperities thereon. This system includes signal processing operative to process an electronic signal generated in response to the presence of an asperity. The glide head assembly comprises a flexure adapted to be secured to the support structure and positionable in proximity to the moving surface. A slider is secured to a distal end portion of the flexure. A piezoelectric transducer is sandwiched partly between the slider and the distal end portion and preferably includes a free end portion which projects outwardly from this region to define a cantilever having a selected length and width. A test device for testing a moving surface on a rotating disk to determine a presence of asperities and a methodology for producing a glide head assembly for use with such a system are also provided.

25 Claims, 3 Drawing Sheets

GLIDE HEAD ASSEMBLY AND METHOD THEREFOR

FIELD OF INVENTION

The present invention is broadly directed to a glide head assembly adapted for use with a system for testing moving surfaces to detect a presence of asperities thereon. More particularly, the present invention is directed to a glide head assembly that is adapted to detect asperities which project above a specified height from moving surfaces. Even more specifically, the present invention concerns a glide head assembly that is adapted to generate an electronic signal in response to the presence of an asperity located on a surface of a rigid memory disk.

BACKGROUND OF THE INVENTION

In recent years, perhaps the most revolutionary development in the history of technology has been the computer. While the fundamental components of a computer's anatomy remain the same, the capabilities of these individual components have increased exponentially as technology rapidly grows. Common to almost every computer is a processing unit which receives input information and processes this information to generate an output. A computer program instructs the processing unit to perform various tasks, and an associated memory unit is incorporated to store instructions for the processing unit and to hold temporary results that occur during operation. The potential applications for computers are virtually limitless and continuing efforts are being made to design computers which are capable of carrying out these repetitious and complex operations at higher speeds.

Computer memories are used to store or "remember" a system of on-off codes for access at a later time, and systems accomplish this in a variety of ways, such as through the utilization of magnetic disks, microchips or optical devices. Where magnetic disks are concerned, patterns of magnetism are formed on the surfaces of the disks in order to store desired information. A magnetic disk may be in the form of either a floppy disk which is used to store and retrieve programs and data, or an arrangement of hard disks which are permanently enclosed in a hard disk drive to prevent contamination. Hard disks have a much greater memory capacity than floppy disks. Memory capacity, of course, is measured in kilobytes, megabytes or even gigabytes, with a single byte equal to eight bits of binary code.

Generally, the hard disk drive within which rigid magnetic memory disks are mounted is akin to a conventional record turntable in that there is a mechanism for rotating the disk with a selected angular velocity and for translating a magnetic head across the surface of the disk to allow for access to a selected annular track. The magnetic disks are typically journaled for rotation about a spindle of the hard drive in a spaced relationship to one another. A tracking arm is associated with each disk and the read-write head is mounted to this tracking arm for accessing the desired information. These magnetic heads are typically referred to as "flying" data heads because they do not contact the surface of the disk during rotation. Rather, the magnetic heads hover above the surface on an air bearing that is located between the disk and the head and which is caused by rotation of the disk at high speeds.

A persisting problem with rigid magnetic memory disks is that asperities, which are essentially protrusions on the surfaces of the disks, may cause an anomaly when encountered by the head during high speed revolutions. These asperities can cause errors in the transfer of information or even damage to the head. In an effort to reduce the occurrences of asperities, manufacturers commonly burnish the memory surfaces of the disk to remove asperities. In the burnishing process a burnishing head, rather than a magnetic read-write head, is mounted in a similar manner relative to the disk as discussed above. Burnishing heads may be designed as either "flying" heads which pass over the surface to be burnished or they may be designed as "contact" burnishing heads which have a contact surface that directly engages the asperities. During the burnishing process, the burnishing head operates to smooth out these surface protrusions.

The next step in further refining magnetic (or optical) disks for production and removing any unwanted asperities which remain after the burnishing operation is through the use of a glide head. The purpose of a glide head is to detect, via proximately or contact, any remaining asperities which may come into contact with the write data head during use. Glide heads are, thus, required to hover and detect asperities which are located above specified data head flying heights. Glide heads dynamically test the integrity of a disk's surfaces.

The magnetic media industry, in particular, is requiring that magnetic recording disks have increasing recording densities. Accordingly, for manufacturers to develop production quality rigid memory disks for use in this industry, and the computer industry in general, it is necessary to utilize glide heads having more sensitive response characteristics. Existing glide heads have inherent problems associated with them because it is difficult to precisely control the electrical response characteristics of these devices.

The electrical response of a glide head is dependent upon detection perimeters of amplitude, frequency, and signal to noise ratio (S/N). However, because the industry's demands for higher magnetic densities requires a lowering of the data heads flying height over the surface of the magnetic disks, it becomes more difficult to tighten the physical tolerances of glide heads and effectively control the frequency, amplitude and signal to noise ratio. Current glide head designs, for example, rely predominantly on the function of an accelerometer to control these detection parameters. Unfortunately, these designs are becoming less effective at detecting asperities as demands increase and they are increasingly susceptible to physical and thermal stresses during shipping and use.

In the past, it has been known to employ a glide head whose slider component, being that portion of the glide head which directly contacts the surface asperities, is configured to include a lateral wing portion that has a layer of piezoelectric material adhered thereto. This piezoelectric material is approximately 20–30 mls (0.020–0.030 inches) thick. As the slider comes into contact with a surface asperity, the crystalline lattice of the piezoelectric material is disturbed. This disturbance causes an electronic signal to be sent, via electrical lead wires, to a signal processing unit. Unfortunately, the same disturbance also causes a variety of other electronic signals to be sent to the processing unit. These other signals are caused by resonant vibrations of other components in the glide head, as well as inherent noise in the system. The frequencies of these mixed electronic signals are unpredictable and, therefore, it is difficult to adequately filter that electronic signal which is specifically associated with the encountered asperity. The reason for this is due, at least in part to the fact that the piezoelectric material experiences no compressive forces and reacts under its own weight when an asperity is encountered. It is, therefore, difficult with these prior devices to reliably detect the presence of asperities on the surfaces of rigid memory disk.

Accordingly, there remains a need to provide a new and useful glide head device which has better electrical response characteristics during the asperity detection process. The present invention is directed at meeting this need, among others.

SUMMARY OF INVENTION

It is an object of the present invention to provide a new and useful glide head assembly that is adapted for use with a system for testing moving surfaces to detect a presence of asperities on these moving surfaces.

Another object of the present invention is to provide a new and useful test device for testing moving surfaces on a rotating disk to determine a presence of asperities thereon.

A further object of the present invention is to provide a new and useful glide head assembly which exhibits improved electrical response characteristics during the asperity detection process.

Yet another object of the present invention is to provide a new and useful glide head assembly which responds in the presence of an asperity to vibrate with a dominant mode of vibration, thereby to produce a dominant signal at a selected dominant frequency.

Still a further object of the present invention is to provide a methodology for producing a glide head assembly for use in a system that is operative to test moving surfaces to determine a presence of asperities on these moving surfaces.

The present invention is directed to a glide head assembly that is associated with a support structure and adapted for use with a system for testing moving surfaces to detect a presence of asperities thereon. The system includes signal processing which operates to process an electronic signal generated in response to the presence of an asperity.

Broadly, the glide head assembly according to the present invention comprises a flexure that extends along a longitudinal axis and includes a proximal end portion adapted to be secured to the support structure and a distal end portion that is adapted to be positioned in proximity to one of the moving surface. A slider is secured to this distal end portion and a piezoelectric transducer is disposed in a region between the slider and the distal end portion so that the transducer is sandwiched therebetween.

It is preferred that the flexure includes a tongue fastened thereto to form the distal end portion and that the transducer and the slider are secured to this tongue. This tongue may be provided with an orientation nub that is sized to position the tongue at a selected angle relative to the flexure's longitudinal axis.

The transducer is preferably configured as a flat plate, including an exposed free end portion which projects outwardly from the region between the distal end portion and the slider to define a cantilever having a selected length. This piezoelectric transducer may be dimensioned such that the cantilever responds to the presence of the asperity relative to the slider as the asperity moves past the glide head to vibrate with a dominant mode of vibration relative to all vibrational modes of the flexure and the slider, thereby to produce a dominant signal at a selected dominant frequency. Preferably, this dominant mode of vibration is established by the exposed free end portion of the transducer.

The glide head assembly according to the present invention may also include electrical contacts that are disposed on the free end portion of the transducer, with these electrical contacts located so as to connect to electrical leads supported by the flexure. A longitudinally extending sleeve may be provided which operates to receive and support these electrical leads.

It is preferred that the transducer is secured to the distal end portion by a first layer of first adhesive and that the glide head is secured to the transducer by a second layer of second adhesive. It is also preferred that these first and second adhesives have different characteristics. For example, the first adhesive may be an electrical insulating material such as an optical grade, ultraviolet adhesive. The second adhesive may be a rigid bond adhesive.

A test device is also provided for testing moving surfaces on a rotating disk to determine a presence of asperities thereon. This test device comprises a support structure, a rotary drive, a first glide assembly supported on the support structure, signal processing electronics and electrical interconnects. The rotary drive operates to rotate a disk relative to the support structure and the signal processing electronics operate to process the electronic signal, while the electrical interconnects establish electrical communication between the transducer and the signal processing electronics.

The first glide head assembly preferably includes a flexure having a proximal end portion secured to the support structure and a distal end portion positioned proximately to one of the moving surfaces. In addition, the first glide head assembly includes a glide head secured to the distal end portion and a piezoelectric transducer that is disposed in a region between the glide head and the distal end portion so that the transducer is sandwiched therebetween. This transducer operates to vibrate in response to the presence of an asperity moving past the glide head to generate the electronic signal. Of course, it should be appreciated that the first glide head assembly which comprises a component of the test device may have characteristics similar to those discussed above.

The present invention also contemplates a method of producing a glide head assembly for use in a system that is operative to test moving surfaces to determine a presence of asperities thereon. This system includes signal processing circuitry which operates to process an electronic signal generated in response to the presence of an asperity. The system further includes a glide head assembly including a flexure having a proximal end portion adapted to be secured to a support structure and a distal end portion that is adapted to be positioned in proximity to one of the moving surfaces. A glide head is disposed on the distal end portion of the flexure and operates to respond to the presence of the asperity.

Broadly, the methodology of the present invention comprises the steps of, first, providing a piezoelectric transducer that, when secured to the distal end portion of the flexure, will vibrate with a dominant frequency of vibration relative to all vibrational modes of the flexure and the slider, thereby to produce a signal having a dominant signal component at a selected dominant frequency. A transducer is secured to the distal end portion of the flexure and this transducer is electrically interconnected to the signal processing circuitry so that the signal processing circuitry receives the signal. This transducer is preferably constructed as discussed above. Finally, the signal is filtered to suppress components thereof that are at frequencies not within a selected bandwith range that includes the dominant frequency. The methodology may also include the step of providing a bandpass filter so that the dominant vibration is matched to the bandwidth of the signal processing.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENT

The present invention broadly relates to a glide head assembly that is adapted to detect a presence of asperities on moving surfaces. During the production of rigid memory disks, it is common that asperities, or protrusions, remain on the surfaces of these disks after the burnishing operation is completed. Because each of these asperities may cause an error in the information transferred or damage to the data head during use, it is necessary to detect the presence of residual asperities to determine if the rigid memory disks meet certain performance criteria. As the density of the information embedded in rigid memory disks increases, it becomes necessary to lower the flying height of data heads over the surfaces of the disks. To avoid damage to the data head during use, then, requires glide heads to detect smaller and smaller asperities which protrude above specified data head flying heights. The present invention is particularly adapted to reliably detect the presence of these smaller asperities.

Figure 1:
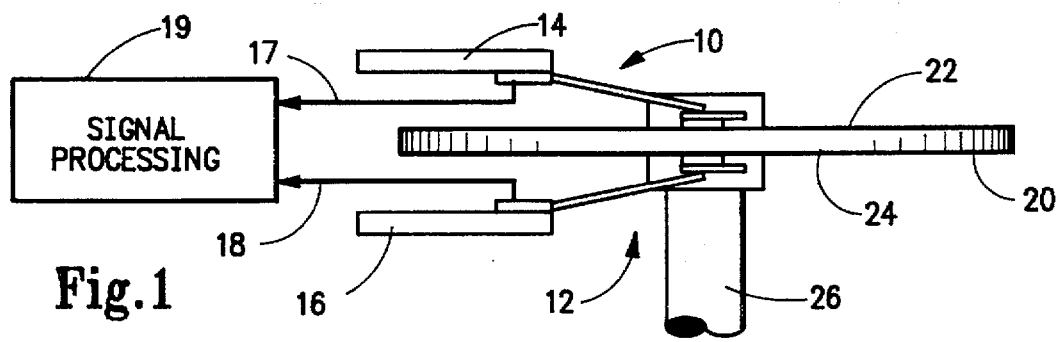
FIG. 1 is a diagrammatic side view of a pair of glide head assemblies according to the exemplary embodiment of the present invention and showing the glide head assemblies in use to detect the presence of asperities on opposite moving surfaces of a magnetic disk.

As generally introduced in FIG. 1, a pair of glide head assemblies 10 and 12 according to the exemplary embodiment of the present invention are shown in use detecting the presence of asperities on opposite surfaces of a rigid magnetic memory disk 20 that is journaled for rotation about spindle 26. While FIG. 1 only depicts the detection apparatus associated with a single rigid memory disk 20, it should be appreciated that a plurality of rigid memory disks could be rotatably journaled about spindle 26, with each of these memory disks having an associated pair of glide head assemblies.

As shown in FIG. 1, each of glide head assemblies 10 and 12 has an associated support structure and is adapted for use with a system for testing one of the moving surfaces of rigid memory disk 20. Specifically, an upper glide head assembly 10 is employed to detect the presence of asperities on an upper surface 22 of rigid memory disk 20. Upper glide head assembly 10 is mounted to a support structure 14 and communicates detection results, via electrical leads 17, to a system that includes signal processing 19. Signal processing 19, a standard monitoring circuitry as is known in the art, includes filtering circuitry capable of selecting a desired bandwidth for monitoring. Similarly, a lower glide head assembly 12 is employed to detect the presence of asperities on a lower surface 24 of rigid memory disk 20. Lower glide head assembly 12 is mounted to a lower support structure 16 and communicates detection results, via electrical leads 18, to signal processing 19.

Figure 2:
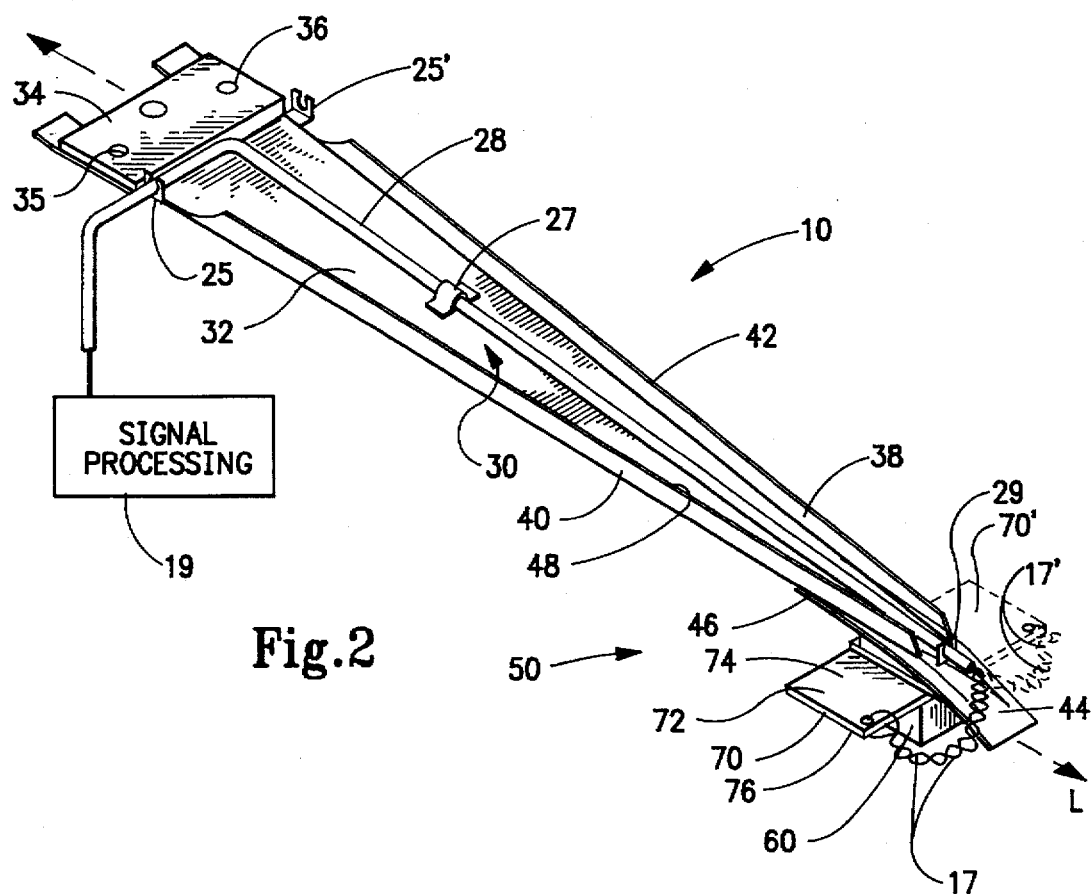
FIG. 2 is a perspective view of the construction of the upper glide head assembly represented in FIG. 1 and showing, in phantom, an alternative position for the piezoelectric transducer as it would be located for the lower glide head assembly in FIG. 1.

The preferred construction of a glide head assembly according to the present invention is best introduced with reference to FIG. 2. Here, it may be seen that the representative upper glide head assembly 10 comprises a flexure 30 and a glide head structure 50. Flexure 30 includes a proximal end portion 32 which is adapted to be mounted to the support structure 14 in FIG. 1 by a mounting bracket 34 that is provided with a pair of spaced apart securement holes 35 and 36. A distal end portion 38 of flexure 30 is adapted to be positioned in proximity to the upper moving surface 22 of rigid memory disk 20. Flexure 30 extends along a longitudinal axis "L" and includes a pair of spaced apart, upstanding sidewalls which are symmetrical about longitudinal axis "L" and converge from proximal end 32 toward distal end 38. Flexure 30 also includes a tongue 44 which is mounted to the flexure 30 and forms distal end portion 38.

Figure 3:
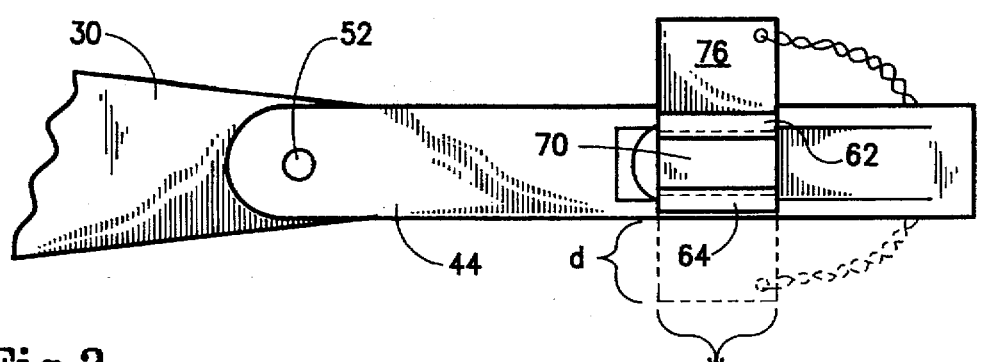
FIG. 3 is an enlarged bottom plan view of a distal end portion of the glide head assembly shown in FIG. 2.

As also shown in FIG. 2, the glide head structure 50 of upper glide head assembly 10 broadly includes a slider 60 that projects downwardly from a lower surface 46 of flexure 30 and a piezoelectric transducer 70 which is partly sandwiched between slider 60 and tongue 44. Piezoelectric transducer 70 is configured as a flat plate and has an exposed free end portion 72 which projects outwardly from a region between distal end portion 38 and slider 60 to define a cantilever having a selected length "d" and a selected width "w", as best shown in FIG. 3. Specifically, it may be seen that exposed free end portion 72 projects laterally of distal end portion 38.

A pair of electrical leads 17 are respectively connected to the upper and lower surfaces 74 and 76 of piezoelectric transducer 70. Layers of gold conducting material may be provided for these connections. The electrical leads 17 operate to communicate electrical signals to signal processing unit 19. A sleeve 28 is disposed longitudinally along an upper surface 48 of flexure 30 and this sleeve 28 operates to receive and support electrical leads 17. A pair of mounting U-brackets 25 and 29 are, respectively, affixed to the proximal end portion 32 and the distal end portion 38 of flexure 30 for this purpose. In addition, a bracket 27 is also provided on the upper surface 48 to help receivably retain sleeve 28 so that the integrity of electrical signals produced by upper glide head assembly 10 is not jeopardized by any unnecessary movement of electrical leads 17 during operation.

It should also be appreciated from FIG. 2 that the construction of lower glide head assembly 12 would be identical to that described herein with reference to upper glide assembly 10, with the exception that the piezoelectrical transducer 70' associated with lower glide head assembly 12 would extend laterally outwardly from an opposite side of flexure 30 and that the electrical leads 17' which are associated therewith could be supported by U-bracket 25' positioned at the proximal end portion 32 of flexure 30.

Figure 5:
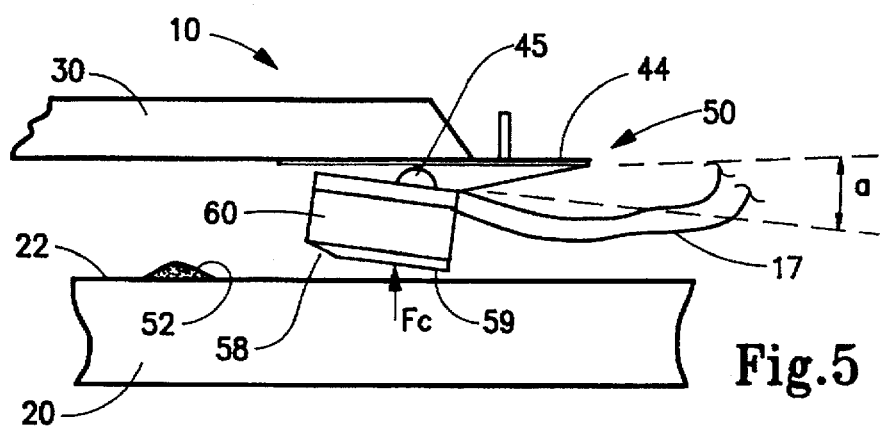
FIG. 5 is a partial side view of the glide head assembly in FIG. 4 and showing the glide head approaching contact with an asperity on the surface of the rotating magnetic disk.

With reference now to FIG. 3, it can be seen that tongue 44 maybe registered with flexure 30 by a tooling hole 52 and thereafter secured to flexure 30 by laser welding as is customarily done in the art to facilitate the manufacturer of flexure 30. While the preferred construction of slider 60 will be described later with reference to FIGS. 5 and 6, it may be seen in FIG. 3 that slider 60 includes a pair of spaced apart and longitudinally extending rails 62 and 64 which project downwardly from slider 60 and contact asperities as they are encountered by glide head assembly 10.

Figure 6:
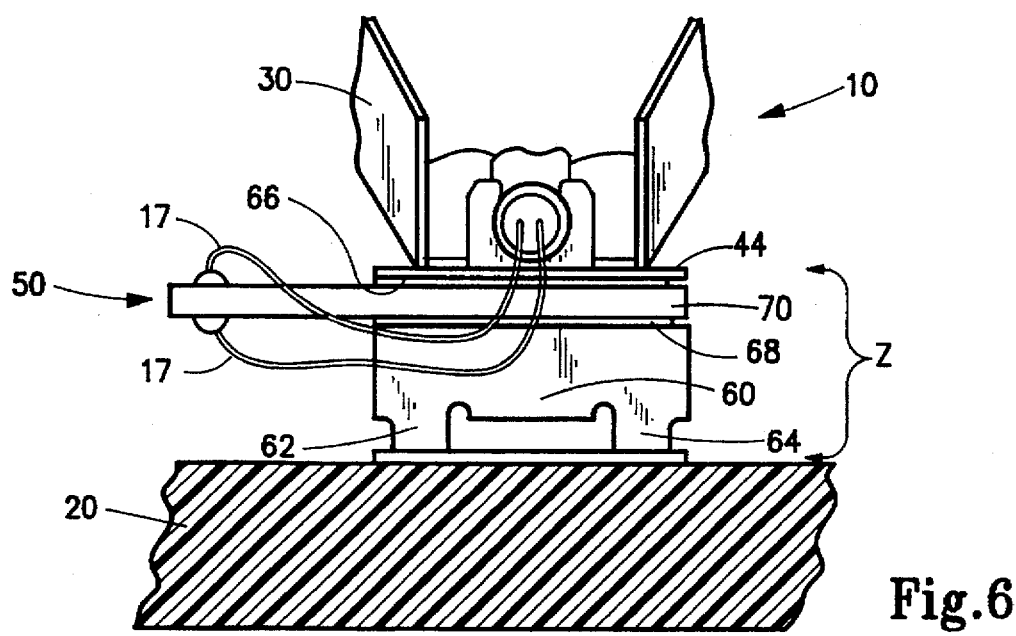
FIG. 6 is a cross-sectional end view, broken away, of the glide head assembly as seen about lines 6—6 in FIG. 5.
Figure 7:
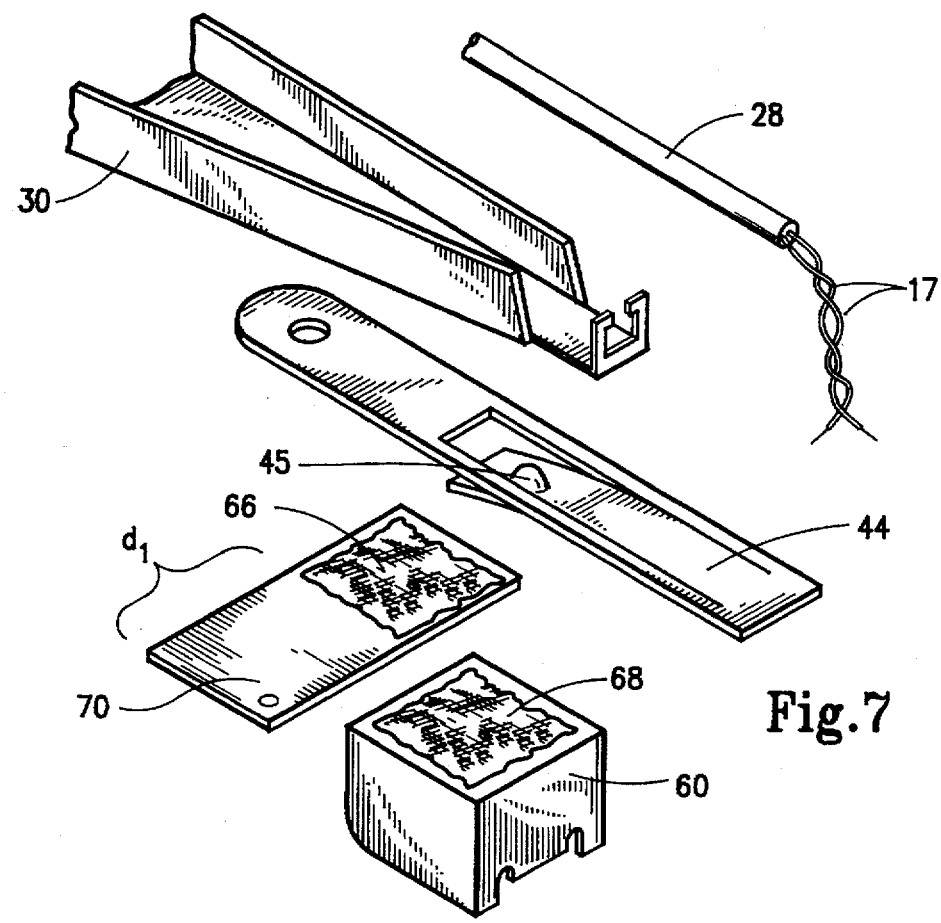
FIG. 7 is an exploded view, broken away, of a preferred construction for the distal end portion of the glide head assembly according to the exemplary embodiment of the present invention.

A preferred construction for the individual components which comprise upper glide head assembly 10 may best be appreciated with reference to the enlarged front end view of FIG. 6 and the exploded view of FIG. 7. From these Figures it may be seen that piezoelectric transducer 70 is secured to the distal end portion 38 of flexure 30, and specifically the lower surface 46 of tongue 44, by a first layer 66 of first adhesive. It is preferred that this first adhesive layer 66 be selected to electrically insulate flexure 30 from the piezoelectric transducer 70. Moreover, it is preferred that this first adhesive layer 66 have a bond that does not distort the slider and has properties to withstand physical and thermal shock. If possible, the first adhesive layer 66 should retain these properties over a period of approximately one year, which is a relatively long life for a glide head. The adhesive of choice which exhibits these desirable characteristics is a Loctite® ImprUV 366, which is an optical grade, ultraviolet adhesive.

A second layer 68 of second adhesive material is also incorporated into upper glide head assembly 10 and operates to secure slider 60 to piezoelectric transducer 70. This second adhesive layer 68 should also have certain bonding characteristics. It has been found that the more rigid this bond, the more sensitive slider 60 is when asperities are encountered. Preferably, the bond of second adhesive layer 68 should also be able to withstand thermal and physical shock and last approximately one year. In addition, second adhesive layer 68 should have a Brookfield viscosity of less than 20,000 cP that will allow a very thin bond of approximately 0.0008" or less which can be cured without exceeding one half the Curie Temperature of the piezoelectric transducer 70, and which can be cured across the entire bond area. Various materials for second adhesive layer 68 have been tested. For example, cyanoacrylate exhibits very good properties initially, but has a tendency to degrade over time. Thus far, the best results have been found by using a Loctite® 352 UV curable adhesive. While this material is tough, flexible, activator cured and impact resistant, it does have a tendency to dampen vibrations.

A Type 2 flexure is preferably incorporated into the upper and lower glide head assemblies 10 and 12 according to the present invention. As commonly understood in the art, design size is a major constraint of Type 2 flexures because these devices are limited to Z-height head thickness of 34 mls (0.034 inches). Specifically, this Z-height, as represented by "z" in FIG. 6, is measured as that distance between the lower surface 46 of flexure 30 and the bottom of slider 60. With these parameters in mind, it is preferred to use a piezoelectric transducer of type Motorola® 3195 HD which has a 7 ml (0.007") thickness and an aluminatic slider that is 17 ml (0.017") thick. To this end, the glide head structure 50 has an approximate thickness of 24 mls (0.024"), which allows for a 10 ml (0.010") variation in the thicknesses of either slider 60 or piezoelectric transducer 70. It is believed that these design parameters for the individual components of glide head structure 50 exhibit the best performance results.

With the foregoing detailed description in mind concerning the exemplary construction of the representative upper glide head assembly 10 according to the present invention, the performance of upper glide head assembly 10 may be better understood. As stated herein, both glide head assemblies 10 and 12 of the present invention are adapted for use with a system for testing moving surfaces of a rigid memory disk 20 in order to detect the presence of asperities thereon. The system includes signal processing operative to process an electronic signal that is generated in response to the presence of an asperity. The operation of representative upper glide head assembly 10 is best explained with reference to FIGS. 4 and 5. Here, upper glide head assembly 10 is employed to detect, via proximity or contact, any remaining asperities which may come into contact with a write data head during use. Upper glide head assembly 10, thus, dynamically tests the integrity of upper surface 22 of memory disk 20 by hovering above specified data head flying heights. These flying heights may be a range of approximately 0.1μ inches to 2μ inches above upper surface 22 depending upon disk manufacturer requirements. For all practical purposes, then, these glide heads can be in contact with the disk surfaces.

Figure 4:
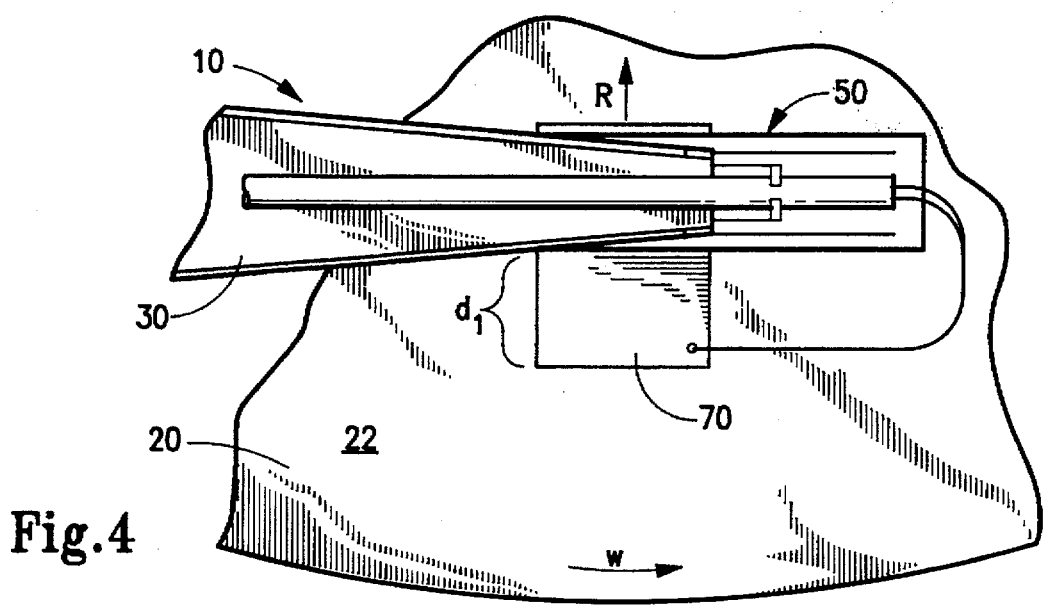
FIG. 4 is an enlarged top plan view of the distal end portion of the glide head assembly of FIG. 2 and showing the glide head hovering over a surface of a magnetic disk that is rotating counterclockwise at an angular velocity "w"

Throughout the testing procedure, rigid memory disk 20 rotates with an angular velocity "w" so that upper surface 22 passes beneath slider 60 with a constant linear velocity as opposed to a constant rpm. As rigid memory disk 20 rotates, upper glide head assembly 10 is moved radially inward in the direction "R" a selected speed so that the entire upper surface area of rigid memory disk 20 passes therebelow. Piezoelectric transducer 70 is oriented away from the center of rigid memory disk 20 so as not to interfere with the spindle 26 as upper glide head assembly 10 is moved radially inward. While FIG. 4 shows a desired orientation of upper glide head assembly 10 relative to disk 20, it should be understood that other orientations are certainly contemplated. For example, flexure 30 could be directed radially along disk 20 without jeopardizing response characteristics. In addition, it should be readily appreciated by one of ordinary skill in this field that angular velocity "w" and radial speed "R" may also be selectively chosen to meet customer requirements for the integrity of rigid memory disk 20.

It is preferred that a leading edge 58 of slider 60 is ramped to provide stability to slider 60 so that glide head structure 50 may fly with a certain pitch, thereby preventing glide head structure 50, and specifically slider 60, from flying too close to upper surface 22 and scoring rigid memory disk 20 during operation. Leading edge 58 hovers approximately 18–20µ" above upper surface 22, while a trailing edge 59 hovers approximately 1–2µ" above upper surface 22. It may be readily understood, then, that as an asperity 52, which typically has a height of 1–2µ", approaches it comes into contact with trailing edge 59. This, in turn, causes slider 60 to pivot about an orientation nub 45 disposed on tongue 44 so that slider 60 is urged upwardly a displacement angle "a". In general terms, this disturbance results in a compressive force $F_c$ being exerted on that portion of piezoelectric transducer 70 which is sandwiched between tongue 44 and slider 60. This compressive force $F_c$ disturbs the crystalline lattice of piezoelectric transducer 70, thereby causing an electronic signal to be generated in electrical leads 17, which signals are communicated back to signal processing unit 19.

However, it should also be appreciated that a variety of other electronic signals are also generated by virtue of the detection of asperity 52. For example, the disturbance causes a forced vibration within flexure 30 and generates an appreciable amount of noise in the system. These signals dampen fairly rapidly. More importantly, though, the disturbance also results in the generation of an electronic signal by virtue of the cantilevered orientation of piezoelectric transducer 70 which acts as a moment arm and begins to vibrate at a dominant amplitude and frequency. Each of these various electronic signals, which have different frequency and amplitude characteristics, are communicated to the signal processing unit 19 where an appropriate bandpass filter may be applied to select the dominant mode.

It has been found that by using the specific parameters discussed herein, that is a piezoelectric transducer 70 having a 7 ml (0.007 inch) thickness with a 67 ml (0.067 inch) overhang and a 17 ml (0.017 inch) slider, this dominant frequency is approximately 420 kHz±50 kHz. Accordingly, a bandpass filter having a range of approximately 200–700 kHz may be employed in signal processing 19 to detect this dominant frequency, which is believed to be caused by the cantilevered action of piezoelectric transducer 70 under these conditions. The remaining electronic signals generated by the disturbance are substantially filtered out by the bandpass filter. For example, the flexure's resonant frequency is typically in the 200 kHz range while the slider's resonant frequency and the harmonics of the system are typically above 700 kHz.

The generation of the dominant mode having desirable frequency, amplitude and signal to noise (S/N) characteristics is what makes the glide head assembly of the present invention advantageous over prior known devices. By positioning the exposed free end portion 72 of piezoelectric transducer 70 laterally outwardly from flexure 30, the transducer 70 is forced to vibrate in this region at the dominant mode. Prior known devices have not realized the advantage of utilizing this feature. Therefore, the frequency response of these systems is very random and a dominant mode signal cannot effectively be filtered to determine whether or not an asperity has actually been encountered.

Figure 8A:
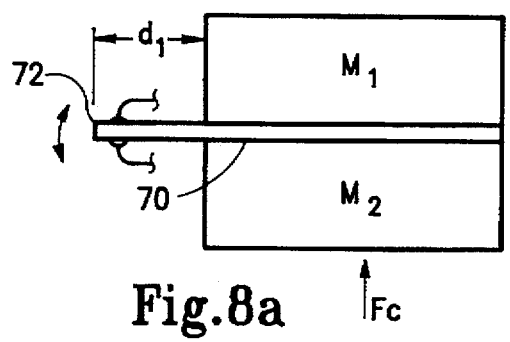
FIG. 8(a) is a diagrammatic view showing a first representative construction for the piezoelectric transducer of the glide head assembly according to the present invention, with the piezoelectric transducer sandwiched between two representative masses, $M_1$ and $M_2$, and extending laterally of these masses to form a cantilever having a selected overhang length "$d_1$"
Figure 8B:
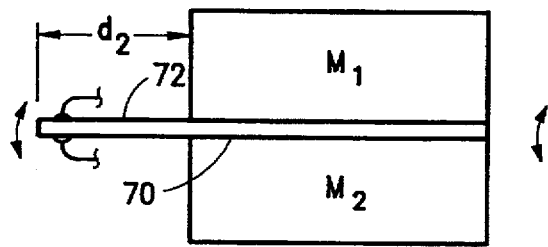
FIG. 8(b) is a diagrammatic view showing a second representative construction for the piezoelectric transducer of the glide head assembly according to the present invention, with the piezoelectric transducer sandwiched between two representative masses, $M_1$ and $M_2$, and extending laterally of these masses to form a cantilever having a selected overhang length "$d_2$"
Figure 8C:
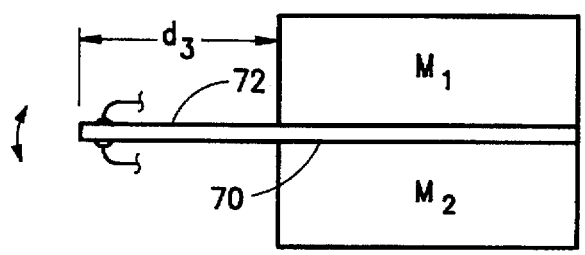
FIG. 8(c) is a diagrammatic view showing a third representative construction for the piezoelectric transducer of the glide head assembly according to the present invention, with the piezoelectric transducer sandwiched between two representative masses, $M_1$ and $M_2$, and extending laterally of these masses to form a cantilever having a selected overhang length "$d_3$".

With reference now to FIGS. 8(a)–8(c), it should be readily understood by one of ordinary skill in this field that the performance characteristics of the glide head assembly according to the present invention will vary depending upon the selected overhang length "d" chosen for piezoelectric transducer 70. FIGS. 8(a)–8(c) are, therefore, illustrative of the affect that a change in this overhang length "d" will have on the system. Thus, while the increase of overhang length from $d_1$ to $d_2$ to $d_3$ will have little affect on the generation of an electronic signal resulting from the compressive force $F_c$ exerted on that portion of piezoelectric transducer 70 which is sandwiched between representative masses $M_1$ and $M_2$, it will affect by amplitude and frequency of the dominant mode signal.

In each of these scenarios, the exposed free end portion 72 of piezoelectric transducer 70 acts as a moment arm which resonates about masses $M_1$ and $M_2$. At its smallest practical length, $d_1$, exposed free portion end 72 vibrates at its highest frequency and lowest amplitude. As the length of exposed free end portion 72 is increased to $d_3$, exposed free end portion 72 vibrates at a lower frequency with a higher amplitude. With a length $d_2$ that is intermediate of length $d_1$ and $d_3$, exposed free end portion 72 would vibrate at an amplitude and frequency which is also intermediate of the two extremes $d_1$ and $d_3$.

It has also been observed that an increase in the thickness of slider 60 corresponds to an increase in frequency of the electronic signal generated by compressive force $F_c$. Therefore, while the performance characteristics of the glide head assembly according to the present invention may be varied by altering the dimensional parameters of the individual components of the assembly, it is believed that the parameters discussed herein generate most reliable results will be perceived during the asperity detection process.

From the foregoing discussion of the exemplary embodiment and operation of the glide head assembly according to the present invention, it may be appreciated that a methodology is also contemplated for producing a glide head assembly for use in a system that is operative to test moving surfaces to define the presence of asperities thereon. The system for performing this methodology includes a signal processing circuitry which operates to process an electronic signal generated in response to the presence of an asperity and a glide head assembly which includes a flexure having a proximal end portion adapted to be secured to a support structure and a distal end portion that is adapted to be positioned in proximity to one of the moving surface. The glide head assembly further includes a slider disposed on the distal end portion of the flexure which operates to respond to the presence of the asperity.

Broadly, the methodology according to the present invention comprises the steps of first providing a piezoelectric transducer that, when secured to the distal end portion of the flexure, will vibrate with a dominant mode of vibration relative to all vibrational modes of the flexure and the slider thereby to produce a dominant signal at a selected dominant frequency. Next, a transducer is secured to the distal end portion of the flexure and this transducer is electrically connected to the signal processing circuitry.

It is preferred that the transducer is sandwiched between the distal end portion of the flexure and the slider, as discussed above, and that this transducer is secured in a manner such as to have an exposed free portion which projects outwardly from this region between the distal end portion and the slider to define a cantilever. Preferably, this transducer is dimensioned such that the dominant mode of vibration is established by the free end portion of the transducer. The methodology may also include the step of matching the dominant frequency to the signal processing circuitry.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

We claim:

1. A glide head assembly associated with a support structure and adapted for use with a system for testing a moving surface to detect a presence of asperities thereon, wherein the system includes signal processing operative to process an electronic signal generated in response to the presence of an asperity, comprising:
   (a) a flexure extending along a longitudinal axis and including a proximal end portion adapted to be secured to said support structure and a distal end portion adapted to be positioned in proximity to the moving surface;
   (b) a slider secured to said distal end portion; and
   (c) a piezoelectric transducer disposed in a region between said slider and said distal end portion so that a portion of said transducer is sandwiched therebetween, said piezoelectric transducer including an exposed free end portion which protects outwardly from the region between said distal end portion and said slider to define a cantilever having a selected length and width.

2. A glide head assembly according to claim 1 wherein said transducer is configured as a flat plate.

3. A glide head assembly according to claim 1 wherein said transducer is dimensioned such that said piezoelectric transducer responds to the presence of the asperity relative to said slider as the asperity moves past said slider to vibrate with a dominant mode of vibration relative to all vibrational modes of said flexure and said slider, thereby to produce a dominant signal at a selected dominant frequency.

4. A glide head assembly according to claim 3 wherein said dominant mode of vibration is established by said free end portion of said transducer.

5. A glide head assembly according to claim 1 wherein said free end portion of said transducer projects laterally of said distal end portion.

6. A glide head assembly according to claim 1 including electrical contacts disposed on said free end portion of said transducer, said contacts located so as to connect to electrical leads supported by said flexure.

7. A glide head assembly according to claim 6 including a sleeve disposed longitudinally along said flexure, said sleeve operative to receive and support said electrical leads.

8. A glide head assembly according to claim 1 wherein said transducer is secured to said distal end portion by a first layer of first adhesive and wherein said slider is secured to said transducer by a second layer of a second adhesive.

9. A glide head assembly according to claim 8 wherein said first and second adhesives have different characteristics.

10. A glide head assembly according to claim 9 wherein said first adhesive is an electrical insulating material.

11. A glide head assembly according to claim 10 wherein said first adhesive is an optical grade, ultraviolet adhesive.

12. A glide head assembly according to claim wherein said second adhesive is a rigid bond adhesive.

13. A glide head assembly according to claim 12 wherein said first adhesive is an electrical insulating, optical grade, ultraviolet adhesive.

14. A glide head assembly according to claim 1 wherein said flexure includes a tongue fastened thereto to form the distal end portion thereof, said transducer and said slider being secured to said tongue.

15. A glide head assembly according to claim 14 wherein said tongue includes an orientation nub sized to position said tongue at a selected angle relative to the longitudinal axis.

16. A test device for testing moving surfaces on a rotating disk to determine a presence of asperities thereon, comprising:
   (a) a support structure;
   (b) a rotary drive operative to rotate a disk thereon relative to said support structure;
   (c) a first glide head assembly supported on said support structure, said first glide head assembly including:
      (1) a flexure extending along a longitudinal axis and including a proximal end portion secured to said support structure and a distal end portion positioned in proximity to one said moving surfaces;
      (2) a slider secured to said distal end portion;
      (3) a piezoelectric transducer disposed in a region between said slider and said distal end position so that said transducer is sandwiched therebetween, said transducer configured as a flat plate and including an exposed free end portion which projects outwardly from the region between said distal end portion and said slider to define a cantilever having a selected length, said transducer operative to vibrate in response to the presence of an asperity moving past said slider to generate an electronic signal;
   (d) signal processing electronics operative to process the electronic signal; and
   (e) electrical interconnects establishing electrical communication between said transducer and said signal processing electronics.

17. A test device according to claim 16 wherein said transducer is dimensioned such that said cantilever responds to the presence of the asperity relative to said slider as the asperity moves past said slider to vibrate with a dominant mode of vibration relative to all vibrational modes of said flexure and said slider, thereby to produce a dominant signal at a selected dominant frequency.

18. A test device according to claim 16 wherein said flexure extends along a longitudinal axis, said free end portion of said transducer projecting laterally of said distal end portion.

19. A test device according to claim 16 wherein said transducer is secure to said distal end portion by a first layer of first adhesive and wherein said slider is secured to said transducer by a second layer of second adhesive.

20. A test device according to claim 16 wherein said flexure includes a tongue fastened thereto to form the distal end portion, said transducer and said slider being secured to said tongue and including an orientation nub on said tongue which is sized to position said tongue at a selected angle relative to the longitudinal axis.

21. A method of producing a glide head assembly for use in a system that is operative to test moving surfaces to determine a presence of asperities thereon, wherein the system includes signal processing circuity operative to process an electronic signal generated in response to the presence of an asperity and wherein said glide head assembly includes a flexure having a proximal end portion adapted to be secured to a support structure and a distal end portion adapted to be positioned in proximity to one of the moving surfaces and including a slider disposed on the distal end portion of said flexure and operative to respond to the presence of the asperity, comprising the steps of:
   (a) providing a piezoelectric transducer that, when secured to the distal end portion of said flexure, will vibrate with a dominant mode of vibration relative to all vibrational modes of said flexure and said slider thereby to produce a signal having a dominant signal component at a selected dominant frequency;

(b) securing said transducer to the distal end portion of said flexure;

(c) electrically interconnecting said transducer to said signal processing circuitry such that said signal processing circuitry receives said signal; and (d) filtering said signal to suppress components thereof that are at frequencies not within a selected bandwidth range that includes the dominant frequency.

22. A method according to claim 21 wherein said transducer is sandwiched between the distal end portion of said flexure and said slider in a region therebetween.

23. A method according to claim 22 wherein said transducer is secured to the distal end portion of said flexure in a manner such as to have an exposed free end portion which projects outwardly from the region between said distal end portion and said slider to define a cantilever having a selected length.

24. A method according to claim 23 wherein said transducer is dimensioned such that the dominant mode of vibration is established by said free end portion of said transducer.

25. A method according to claim 21 including the step of matching the bandwidth of said signal processing circuitry to said dominant frequency.

* * * * *